(12) United States Patent  
Bujewicz et al.

(10) Patent No.: US 12,215,791 B2
(45) Date of Patent: Feb. 4, 2025

(54) FLAPPER SERVO VALVE

(71) Applicant: Hamilton Sundstrand Corporation, Charlotte, NC (US)

(72) Inventors: Maciej Bujewicz, Wrocław (PL); Marcin Korczyński, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 161 days.

(21) Appl. No.: 18/062,114

(22) Filed: Dec. 6, 2022

(65) Prior Publication Data

US 2023/0175595 A1 Jun. 8, 2023

(30) Foreign Application Priority Data

Dec. 8, 2021 (EP) .................................. 21461631

(51) Int. Cl.
*F16K 1/44* (2006.01)
*F16K 31/04* (2006.01)

(52) U.S. Cl.
CPC ................ *F16K 1/44* (2013.01); *F16K 31/04* (2013.01)

(58) Field of Classification Search
CPC ...................................................... F16K 31/04
See application file for complete search history.

(56) References Cited

U.S. PATENT DOCUMENTS

| | | | |
|---|---|---|---|
| 2,924,241 A | 2/1960 | Bauer | |
| 4,333,498 A * | 6/1982 | Huling | F15B 13/0438 137/625.62 |
| 4,352,367 A * | 10/1982 | Pollman | F15C 3/14 137/625.5 |
| 4,362,182 A | 12/1982 | Sjolund | |
| 5,027,856 A * | 7/1991 | Deininger | F15B 13/043 137/625.62 |
| 9,309,900 B2 | 4/2016 | Kopp | |
| 9,328,839 B2 | 5/2016 | Arend et al. | |

(Continued)

FOREIGN PATENT DOCUMENTS

| EP | 2657459 A2 | 10/2013 |
|---|---|---|
| EP | 2657459 A3 | 11/2016 |
| EP | 3537581 A1 | 9/2019 |

(Continued)

OTHER PUBLICATIONS

Abstract for JPH05187412 (A), Published: Jul. 27, 1993, 1 page.
European Search Report for Application No. 21461631.0, mailed May 19, 2022, 21 pages.

*Primary Examiner* — Eric Keasel
(74) *Attorney, Agent, or Firm* — CANTOR COLBURN LLP (57) ABSTRACT

A servo valve includes a fluid transfer valve assembly comprising a valve body having a supply port and a control port (C1). The valve body has first and second nozzles and a drive member therebetween, arranged to regulate flow of fluid from the supply port to the control port in response to a control signal. The assembly also includes a drive assembly comprising a magnetic coil and a core passing through the coil and configured to move axially with respect to the coil when the coil is powered by a current dependent on the control signal, the drive assembly arranged to move the drive member relative to the first and second nozzles in response to the control signal.

12 Claims, 6 Drawing Sheets

(56) References Cited

U.S. PATENT DOCUMENTS

| | | |
|---|---|---|
| 9,404,513 B2 | 8/2016 | Baker et al. |
| 2015/0047729 A1 | 2/2015 | Kopp et al. |

FOREIGN PATENT DOCUMENTS

| | | |
|---|---|---|
| EP | 3597937 A1 | 1/2020 |
| EP | 3901473 A1 | 10/2021 |
| GB | 2104249 A | 3/1983 |
| JP | H05187412 A | 7/1993 |

\* cited by examiner

FLAPPER SERVO VALVE

CROSS-REFERENCE TO RELATED APPLICATIONS

This application claims priority to European Patent Application No. 21461631.0 filed Dec. 8, 2021, the entire contents of which is incorporated herein by reference.

TECHNICAL BACKGROUND

The present disclosure is concerned with servo valves and, in particular, so-called flapper servo valves.

BACKGROUND

Servo valves find a wide range of applications for controlling air, fuel, oil or other fluid flows to effect driving or control of another part, e.g., an actuator.

A servo valve assembly may include a drive assembly such as a motor controlled by a control current which controls fluid flow to or from an actuator. Generally, a servo valve transforms an input control signal into movement of an actuator cylinder. The actuator controls another component which, in some examples, may be a valve. In other words, a servo valve acts as a controller, which commands the actuator, which changes the position of a valve's flow modulating feature.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic, fuel and hydraulic fluids to an actuator, e.g. to control moving parts such as fuel or air systems. Some examples of applications are aircraft, automotive systems and in the space industry.

Conventionally, servo valve systems operate by obtaining pressurised fluid from a high pressure source which is transmitted through the valve from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can be dual stage valve, with a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to control flow through a first, pilot, stage which controls fluid flow to drive the second stage valve member e.g. a spool valve by controlling the flow of fluid acting on the spool. Movement of the spool causes alignment between the ports and fluid channels to be changed to define different flow paths for the control flow.

For low power applications, servo valves can be single stage valves, where the motor drives the flapper to control fluid flow through the main (single) stage of the valve, i.e. the valve body.

Conventional single stage servo valve systems will be described in more detail below with reference to FIGS. 1A and 1B.

In summary, in a conventional single-stage flapper type servo valve, a valve body is provided with a supply port, a control port and a return port. The valve is configured to regulate the flow of fluid from the supply port through the control port from where the fluid flows to e.g. an actuator to be controlled. With a flapper type valve, nozzles are provided in the valve body between the supply port and the control port and between the control port and the return port. A flapper element is positioned between the nozzles in the valve body and is movable relative to the nozzles according to a command signal. The flapper, in a neutral or zero position is equidistant between the nozzles such that the flow between the supply port and the control port and between the control port and the return port is small (due to the small gap between the flapper and each nozzle) and equal. If it is required to provide greater flow through the control port, the flapper is driven such that it moves closer to the nozzle between the control port and the return port than the nozzle between the supply port and the control port. This then closes (or reduces) the flow path between the control port and the return port and opens/increases the size of the flow path between the supply port and the control port. If the flapper is driven in the opposite direction, the flow path between the supply port and the control port is reduced/blocked and the flow path between the control port and the return port is opened/increased.

The flapper is driven by a torque motor that causes rotation of the flapper in response to the command signal. The flapper assembly conventionally includes an elongate flapper element mounted to a torsion plate supported on a torsion bridge. The plate is mounted between pairs of coils of the torque motor with precise air gaps therebetween for biasing the flapper to its neutral or zero position between the nozzles of the valve body. An electrical commend signal to the motor excites the motor coils which cause rotation of the flapper.

Conventional flapper and motor assemblies, however, are relative complex and expensive and time intensive to manufacture and result in a bulky envelope of the servo valve unit. Brazed connections are required between the flapper assembly components, which is complicated and costly, and the air gaps must be cut very precisely to ensure accurate positioning of the flapper relative to the nozzles. As the nozzles are very small, this accuracy is crucial to the reliable operation of the valve. In addition, in conventional assemblies, the nozzles are manufactured as separate components and are then fitted into the valve body. Again, this requires great accuracy and is cost and time intensive.

There is, therefore, a need for a simpler, less expensive, smaller and lighter flapper type servo valve assembly whilst maintaining accuracy and reliability of operation.

SUMMARY

According to the disclosure, there is provided a servo valve comprising: a fluid transfer valve assembly comprising a valve body having a supply port and a control port; the valve body comprising first and second nozzles and a drive member therebetween, arranged to regulate flow of fluid from the supply port to the control port in response to a control signal; and a drive assembly comprising a magnetic coil and a core passing through the coil and configured to move axially with respect to the coil when the coil is powered by a current dependent on the control signal, the drive assembly arranged to move the drive member relative to the first and second nozzles in response to the control signal, wherein the drive member comprises an elongate flapper member having a first end located between the first nozzle and the second nozzle and a second end received in the core of the drive assembly, such that axial movement of the core causes side-to-side movement of the end of the drive member between the nozzles such as to vary the spacing between the end and at least one of the nozzles as the end moves relative to the first and second nozzles.

BRIEF DESCRIPTION

Examples of a servo valve according to the disclosure will now be described with reference to the drawings. It should be understood that variations are possible within the scope of the invention as defined by the claims.

DETAILED DESCRIPTION

A servo valve as described below can, for example, be used in an actuator control system. The servo valve is controlled by a drive assembly to control a flow of fluid that is output to control the movement of an actuator.

Conventional single-stage flapper servo valves will first be described with reference to FIGS. 1A and 1B.

Figure 1A:
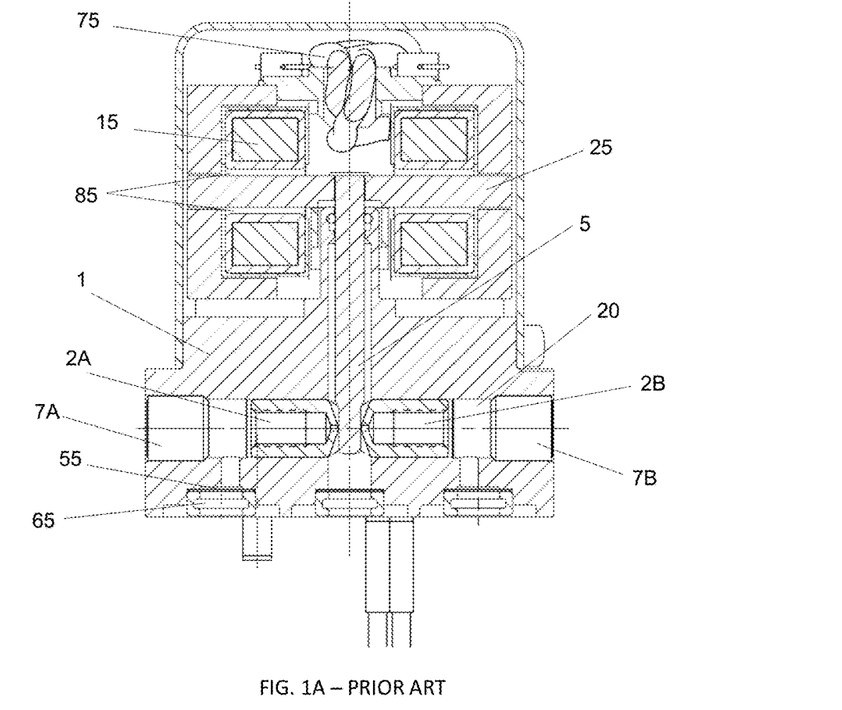
FIG. 1A shows a section through a conventional flapper type single stage servo valve.
Figure 1B:
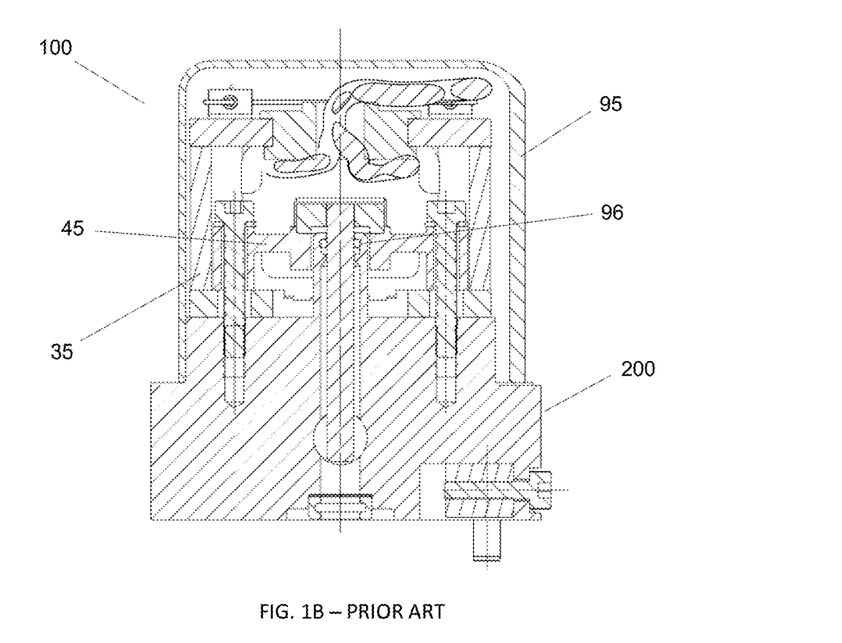
FIG. 1B is a side view of the servo valve of FIG. 1A.
Figure 2A:
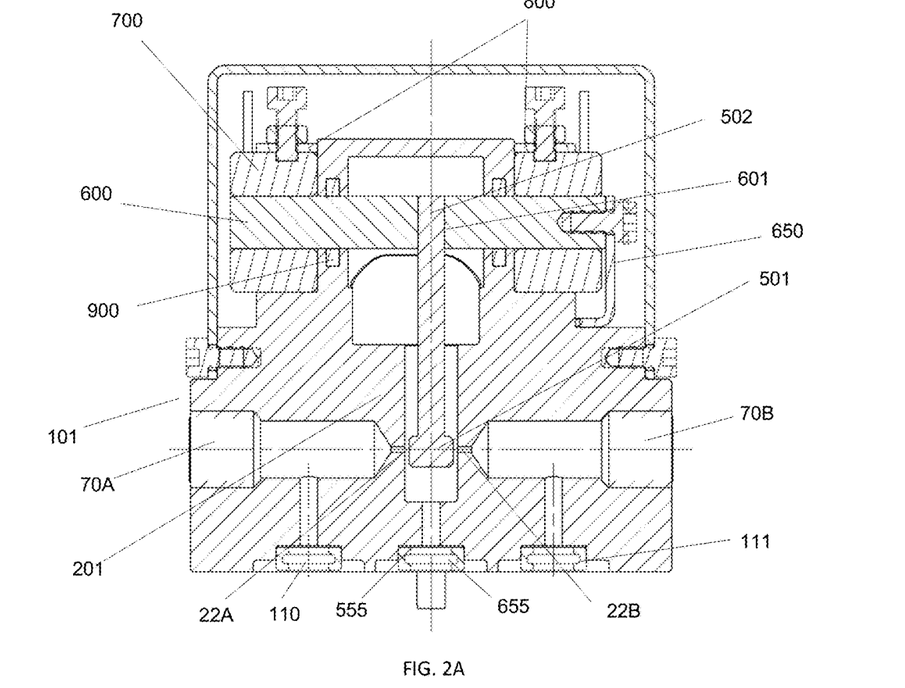
FIG. 2A shows a section through a flapper type single stage servo valve according to the disclosure.
Figure 2B:
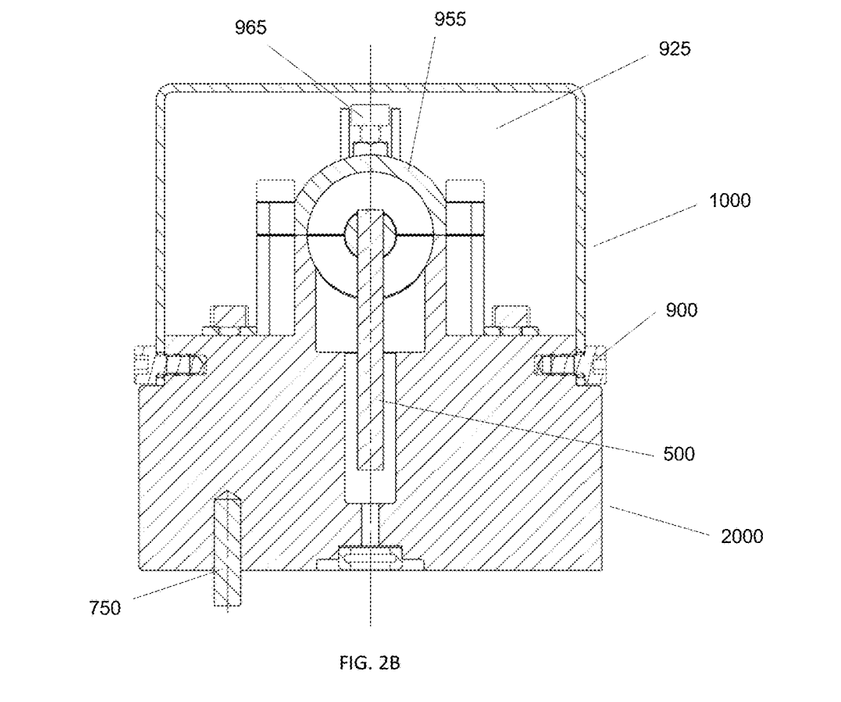
FIG. 2B is a side view of the servo valve of FIG. 2A.
Figure 3A:
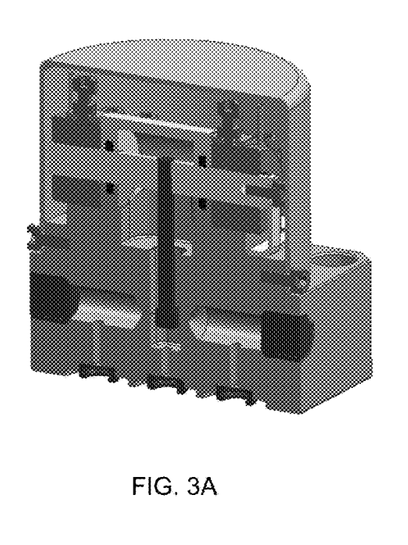
FIG. 3A is a 3D sectional view of a servo valve according to the disclosure.
Figure 3B:
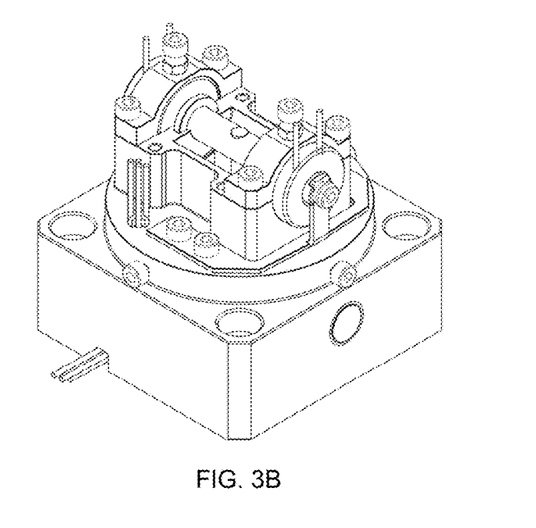
FIG. 3B is a partial 3D view of a servo valve according to the disclosure for explaining the stages of assembly.
Figure 3C:
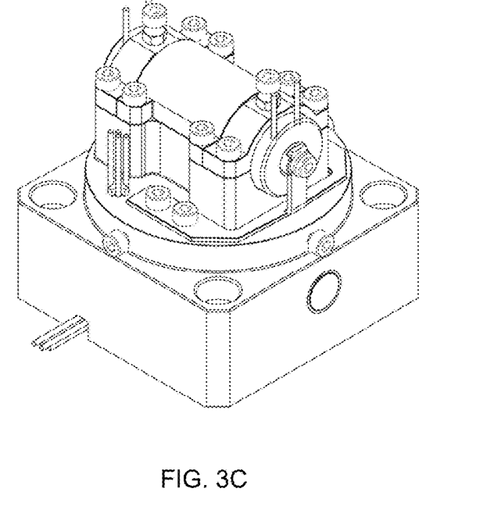
FIG. 3C is a further partial 3D view of a servo valve according to the disclosure for explaining the stages of assembly.
Figure 3D:
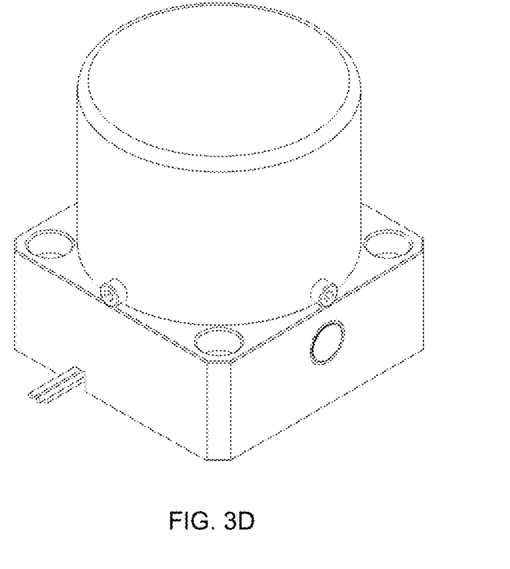
FIG. 3D is a 3D view of a fully assembled servo valve according to the disclosure.
Figure 4:
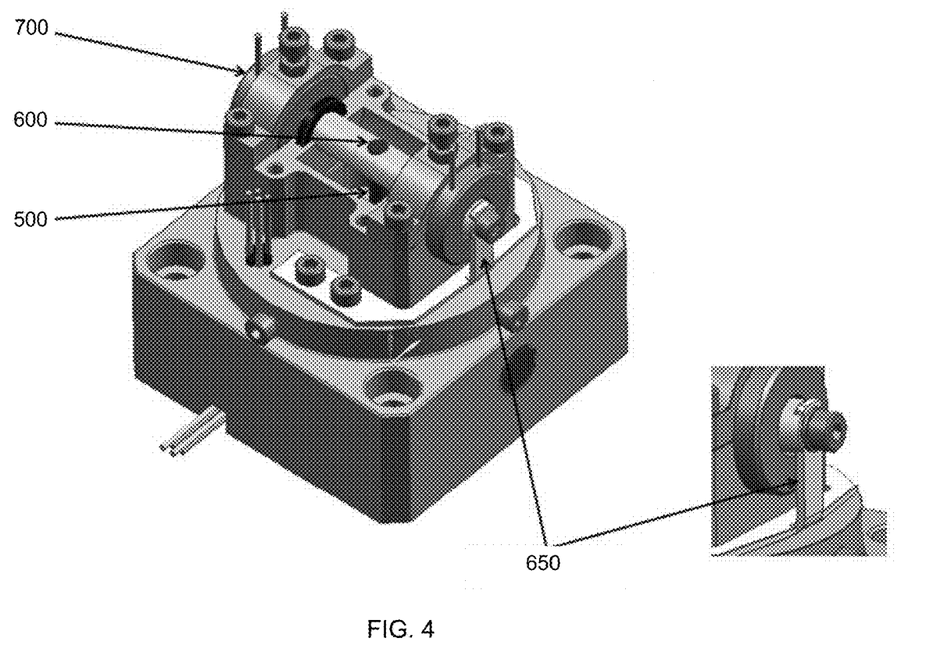
FIG. 4 is a top perspective view of part of a servo valve according to the disclosure.

A typical single-stage flapper servo valve is shown in FIGS. 1A and 1B. The assembly comprises a drive assembly 100, and a valve body assembly 200. The valve body assembly includes a housing 1 defining a valve body 20 closed at each end by a plug 7A, 7B. Pressurised fluid is provided to the valve body 20 from a supply port 10 and exits the valve body 20 via a return port 11. A flapper 5 extends into the valve body 20. The position of the flapper 5 in the valve body 20 is controlled by the drive assembly to regulate the flow of pressurised fluid from the valve body 20 out through a control port C to control e.g. a piston of the actuator or other moveable part. Nozzles 2A, 2B are provided in the valve body 20 either side of the flapper 5. The first nozzle 2A is between the flapper and the supply port 10 and the second nozzle 2B is between the flapper and the return port 11. In a balanced or neutral position, the flapper is equidistant from both nozzles and so the gap A, between the first nozzle 2A and the flapper 5 is equal to the gap B between the flapper and the second nozzle 2B. Fluid pressure is, therefore, equal either side of the flapper. If it is desired to provide fluid from the control port C to e.g. move an actuator piston (not shown) in a given direction, a command is provided to the drive, which in FIGS. 1A and 1B is a torque motor, which pivots the flapper towards nozzle 2B—i.e. from left to right in FIG. 1A which increases gap A to increase the fluid flow passage from the first nozzle 2A such that fluid from the supply port 10 flows out through the control port C. The more the flapper turns from the neutral position, e.g. to the right, the greater is gap A compared to gap B and so the fluid flow to port C (and beyond) is greater, while the flow to return port 11 is less. This difference causes the piston to move in a first direction. If the position of the flapper is reversed and gap A is smaller than gap B, then there is less flow through nozzle 2A to port C and more flow from port C to port 11, which causes the piston to move in the opposite direction. Filters 55 and/or screen rings 65 may be provided to filter fluid at the ports.

In more detail, in the conventional flapper type assemblies, to open the servo valve, control current is provided to coils 15 of the motor (e.g. a torque motor) creating electromagnetic torque opposing the sum of mechanical and magnetic torque already 'present' in the torque motor. The bigger the electromagnetic force from the coils, the more the flapper pivots. The more it pivots, the greater the flow through the control port C. A torque motor usually consists of coil windings 15, a ferromagnetic armature 25, permanent magnets 35 and a mechanical spring forming a torsional bridge 45 (e.g. two torsional bridge shafts). This arrangement provides movement of the flapper proportional to the input control current.

Electric wiring 75 is provided to provide the command signal to the motor.

Air gaps 85 are provided between the motor coils and the armature to ensure precise positioning of the flapper in its neutral position between the nozzles. These air gaps have to be precisely cut. If there is any imprecision in the size and shape of the air gaps, this can result in valve failure where the armature 25 plate to the pole pieces of the motor. The cutting process is performed by an EDM machine and is time consuming. Because the process takes place on the assembled valve fluid used in the cutting process can introduce dirt which, if not properly rinsed, can block the valve during operation.

The drive assembly 100 is enclosed by a cover 95 that sits on the housing 1 of the valve assembly 200.

An O-ring 96 can provide sealing support around the flapper.

As mentioned above, conventional flapper type servo valves requires complex and expensive parts and require brazed connections between the armature plate, the flapper and the torsion bridge. The air gaps and the nozzles also have to be very precisely manufactured.

The servo valve of the present disclosure provides an alternative structure and principle of operation to overcome these problems.

In particular, the flapper assembly and its operation is modified to avoid the need for the brazed connections and precise air gaps, as will be described further below. Furthermore, the nozzles may be formed as part of the valve body e-g-by drilling nozzle holes in the valve body structure, rather than being formed as separate parts.

The flapper of the disclosure comprises an elongate flapper member that is press fit into a drive core and extends from the core into the vale body between the nozzles. Rather than causing rotational movement of the flapper, the drive assembly of the disclosure causes a sliding movement of the flapper from left to right.

The modified servo valve according to the disclosure will now be described with reference to examples shown in FIGS. 2 to 6.

Similar to the typical servo valve described above with reference to FIGS. 1A and 1B, the servo valve of the disclosure has a drive assembly 1000, and a valve body assembly 2000. The valve body assembly includes a housing 101 defining a valve body 201 closed at each end by a plug 70A, 70B. Pressurised fluid is provided to the valve body 201 from a supply port 110 and exits the valve body 201 via a return port 111. A flapper 500 extends into the valve body 201. The position of the flapper 500 in the valve body 201 is controlled by the drive assembly to regulate the flow of pressurised fluid from the valve body 201 out through a control port C1 to control the actuator or other moveable part. Nozzles 22A, 22B are provided in the valve body 201 either side of the flapper 500. The first nozzle 22A is between the flapper and the supply port 110 and the second nozzle 22B is between the flapper and the return port 111. In a balanced or neutral position, the flapper is equidistant from both nozzles and so the gap A, between the first nozzle 22A and the flapper 500 is equal to the gap B between the flapper and the second nozzle 22B. Fluid pressure is, therefore, equal either side of the flapper. If it is desired to provide fluid from the control port C1 to e.g. move an actuator piston (not shown) in a given direction, a command is provided to the drive, which, as described further below, slides the flapper towards nozzle 22B—i.e. from left to right in FIG. 2A which increases gap A to increase the fluid flow passage from the first nozzle 22A such that fluid from the supply port 110 flows out through the control port C1. The more the flapper moves laterally from the neutral position, e.g. to the right, the greater is gap A compared to gap B and so the fluid flow to port C1 (and beyond) is greater, while the flow to return port 111 is less. This difference causes e.g. a connected actuator piston (not shown) to move in a first direction. If the position of the flapper is reversed and gap A is smaller than gap B, then there is less flow through nozzle 22A to port C1 and more flow from port C1 to port 111, which causes the piston to move in the opposite direction. Filters 555 and/or screen rings 655 may be provided to filter fluid at the ports.

The drive assembly that causes movement of the flapper 500 in response to a command signal differs from the conventional assembly described above.

The flapper 500 extends from the drive assembly into the valve body 201 such that one end 501 of the flapper is located between the nozzles 22A, 22B. The other end 502 of the flapper 500 is press-fit into a hole 601 through a drive core 600. The core 600 is located between motor coils 700.

In the example shown, the coils are secured by means of a clip 800 but other means for securing the coils may be used.

Seals 900 may also be provided around the core.

To bias the servo valve to the neutral position, a spring 650 may be mounted to the core 600 and the valve body housing 101.

A cover 955 can be fitted over the core 600 e.g. by one or more screws 965 and then the entire drive assembly can be enclosed by an outer cover 975 that can be attached or secured e.g. by screws 990 to the valve assembly housing.

A pin 750 can be provided on the bottom of the assembly to allow location of the valve relative to e.g. an actuator to be driven by fluid flow from the control port C1.

The principle of operation of the servo valve of the disclosure will now be explained in more detail.

As mentioned, the valve body 201 defines two nozzles 22A, 22B. Whilst these may be defined by means of nozzle inserts such as described in relation to FIGS. 1A and 1B, in a preferred example, the nozzles are integrally formed as channels in the valve body 201 e.g. by drilling.

In a neutral position (i.e. when there is no command to move the flapper 500), the spring 650 biases the system against the coils' magnetic force so that the flapper end 501 is equidistant from the two nozzles 22A, 22B. When the coil 700 is powered, the coil 700 magnetises the core 600 so that the core begins to move (left to right or vice versa in the drawing of FIG. 2A). The spring 650 acts against the magnetic force to bias the flapper to its neutral position. To move the flapper in a first direction away from the neutral position, the coil 700 has a first polarity. An opposite polarity is applied to move the flapper in the opposite direction.

To calibrate the flapper to the neutral position, cover 955 is removed, the spring 650 is loosened (e.g. by loosening the spring screw 601), the flapper 500 is set to its neutral position and the spring is then fixed again by tightening the screw 601. The covers 955 and 975 are then assembled.

Due to this calibration, the precision of the air gaps becomes less important.

The drawings show two coils although only one is required for operation of the assembly. The other may be redundant and present for safety reasons.

Figure 5A:
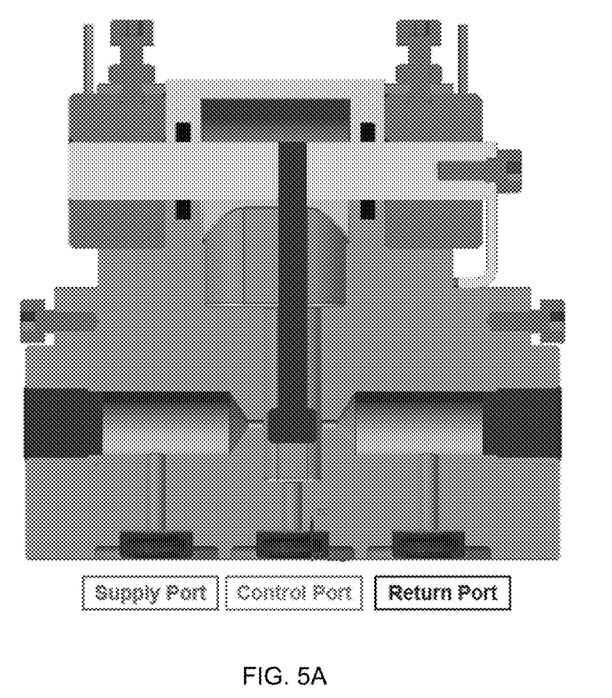
FIG. 5A is a sectional view of a servo valve according to the disclosure, used for explaining the operation of the flapper.
Figure 5B:
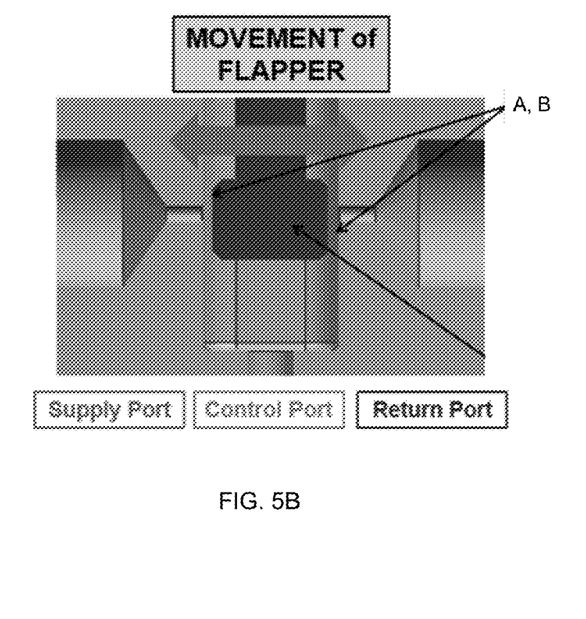
FIGS. 5B and 5C are details of FIG. 5A.
Figure 5C:
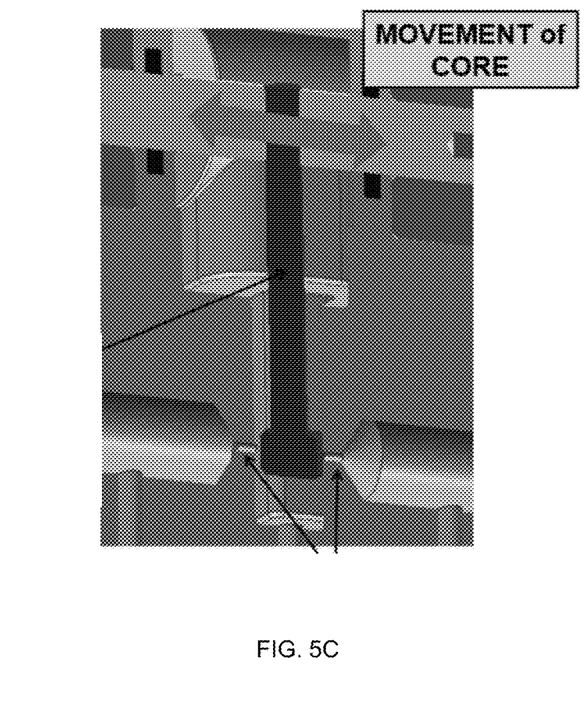
Figure 6:
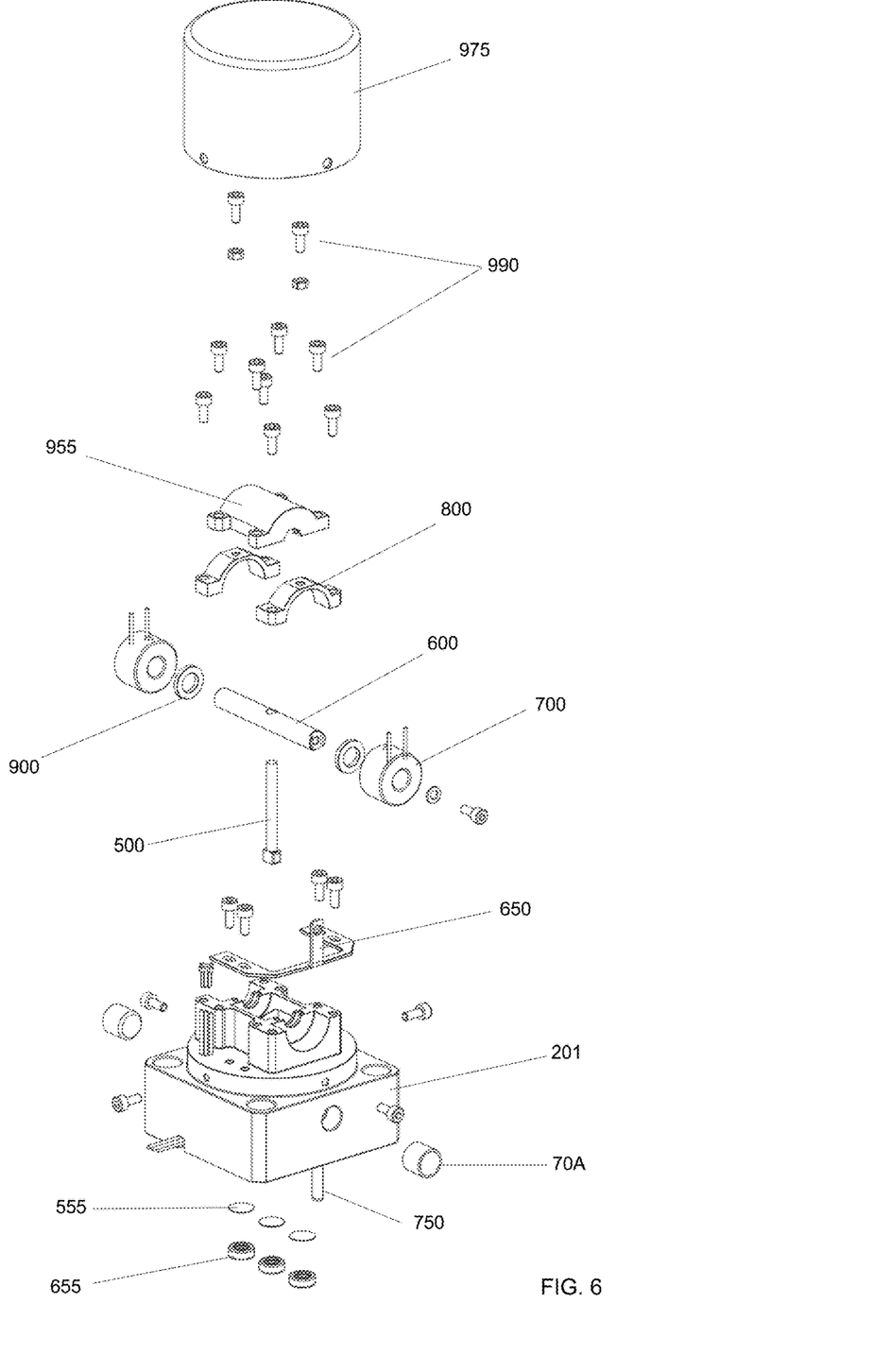
FIG. 6 is an exploded view of a servo valve according to the disclosure.

The flapper movement can be seen most clearly in FIGS. 5A to 5C. The flapper 500 is secured in the core 600 by a press fit. The coils cause side-to-side movement of the core and, therefore, side-to-side movement of the flapper 500 thus changing the relative spacing or gaps A, B between the flapper end 501 and the nozzles 22A, 22B.

The servo valve of this disclosure eliminates the need for as many complex and expensive parts and eliminates the brazing process used in conventional assemblies. The air gaps are also eliminated as well as, in some examples, the need to manufacture and assemble separate nozzles. Calibration of the assembly with respect to the neutral position is also simplified.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A servo valve comprising:
   a fluid transfer valve assembly comprising a valve body having a supply port and a control port (C1);
   the valve body comprising first and second nozzles and a drive member therebetween, arranged to regulate flow of fluid from the supply port to the control port in response to a control signal; and
   a drive assembly comprising a magnetic coil and a core passing through the coil and configured to move axially with respect to the coil when the coil is powered by a current dependent on the control signal, the drive assembly arranged to move the drive member relative to the first and second nozzles in response to the control signal,
   wherein the drive member comprises an elongate flapper member having a first end located between the first nozzle and the second nozzle and a second end received in the core of the drive assembly, such that axial movement of the core causes side-to-side movement of the end of the drive member between the nozzles such as to vary the spacing (A, B) between the end and at least one of the nozzles as the end moves relative to the first and second nozzles.

2. A servo valve as claimed in claim 1, wherein the second end of the flapper member is secured in the core by a press-fit engagement.

3. A servo valve as claimed in claim 1, wherein the first nozzle and the second nozzle are formed as an integral part of the valve body by drilling through the valve body.

4. A servo valve as claimed in claim 1, further comprising: a plug closing each end of the valve body.

5. A servo valve as claimed in claim 1, further comprising: a filter and or a screen ring in the valve body at the control port or the supply port.

6. A servo valve as claimed in claim 1, drive assembly having two magnetic coils and two cores.

7. A servo valve as claimed in claim 1, further comprising: means for securing the magnetic coil in position.

8. A servo valve as claimed in claim 1, further comprising: sealing means around the core.

9. A servo valve as claimed in claim 1, further comprising: a spring arranged to bias the valve to the neutral position.

10. A servo valve as claimed in claim 9, wherein the spring is mounted to the core and to the valve body.

11. A servo valve as claimed in claim 1, further comprising a removable cover arranged to fit over the core.

12. An actuator assembly comprising:
an actuator having a piston moveable within a cylinder; and
a servo valve as claimed in any preceding claim, connected to the actuator such that fluid from the control port causes movement of the piston in the cylinder.

* * * * *